United States Patent Office 3,280,303
Patented Oct. 18, 1966

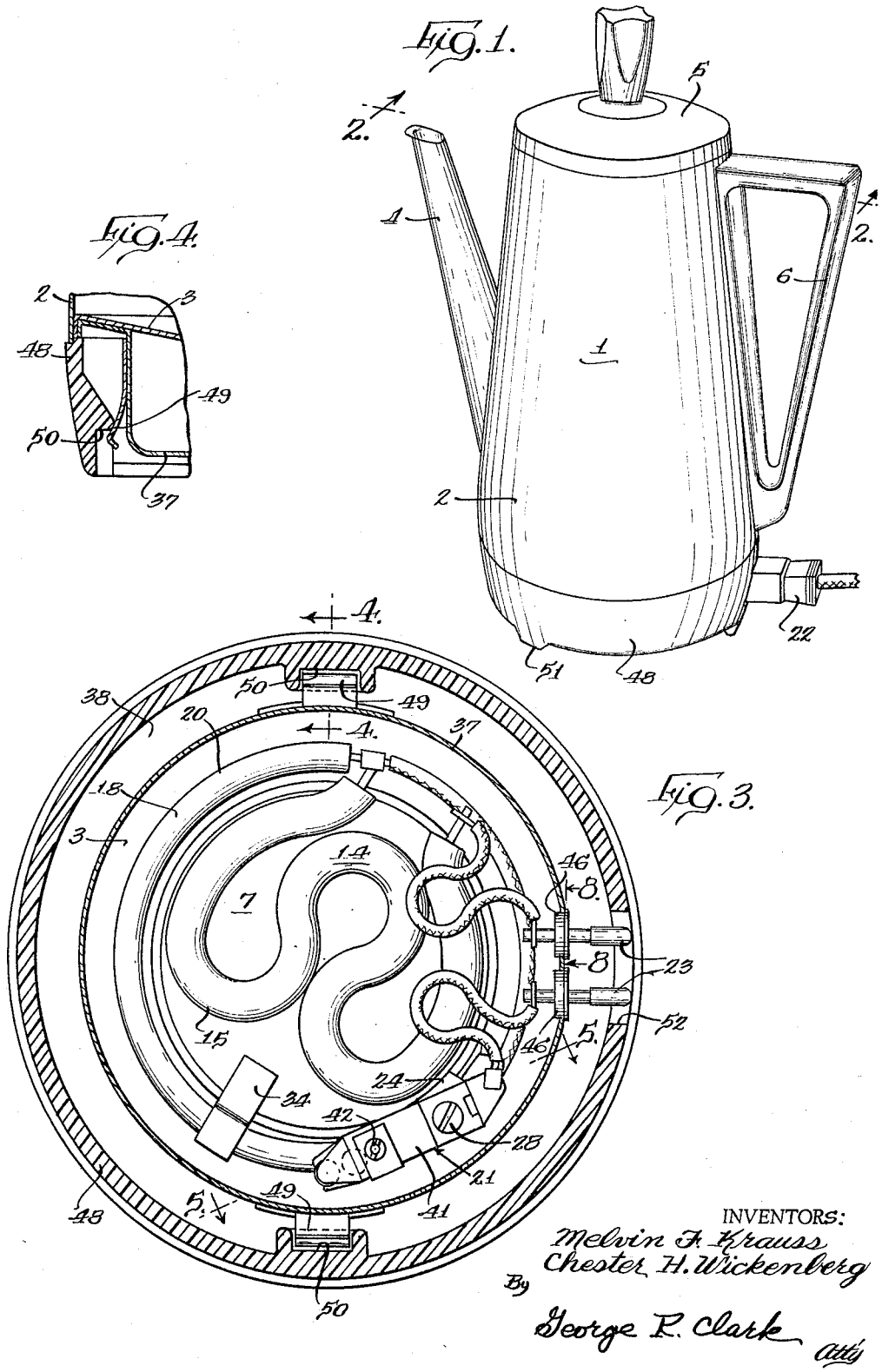

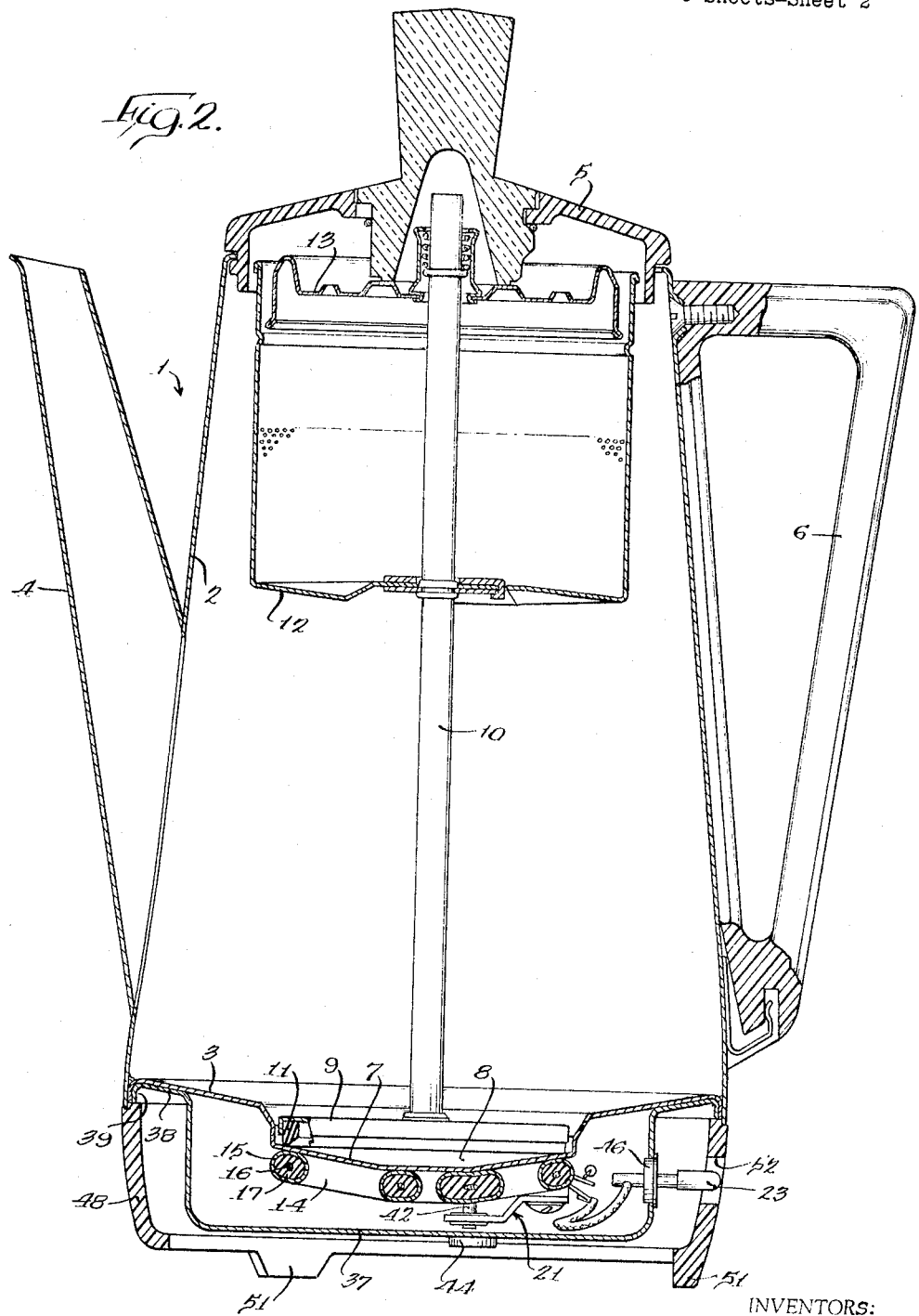

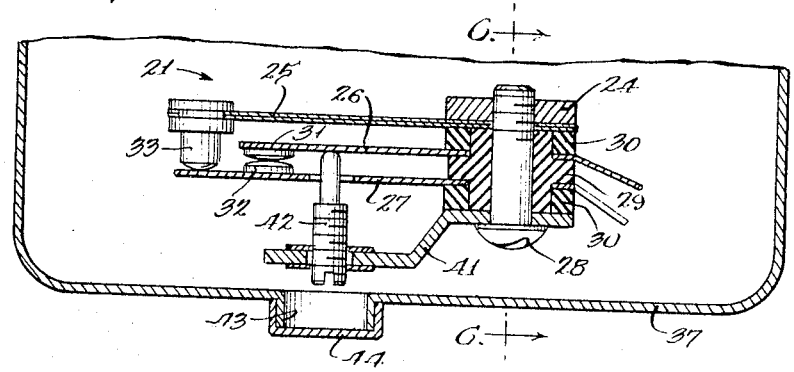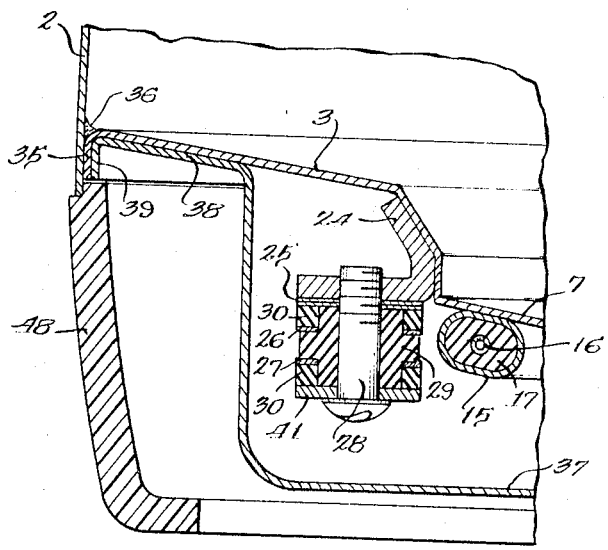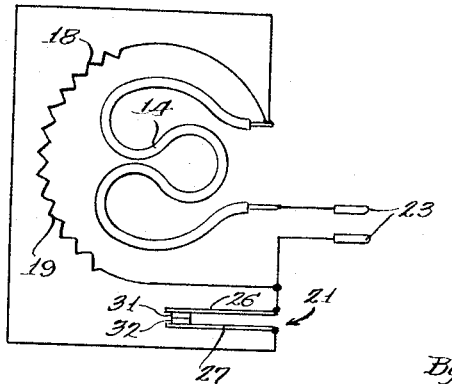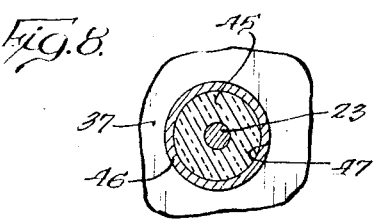

3,280,303
IMMERSIBLE ELECTRIC COFFEE PERCOLATOR
Melvin F. Krauss, Elmhurst, and Chester H. Wickenberg, Elgin, Ill., assignors to Sunbeam Corporation, Chicago, Ill., a corporation of Illinois
Filed Feb. 15, 1963, Ser. No. 258,839
2 Claims. (Cl. 219—441)

This invention relates to a cooking device and, more particularly, to an improved electric cooking device such as an improved electric coffee percolator.

There have been attempts in the electric appliance industry to provide electric applicances which can be fully immersed in a liquid for purposes of cleaning. However, some of these attempts have fallen short of realization because after relatively short periods of use the devices have proven not liquid tight.

Accordingly, it is one object of this invention to provide an improved low cost immersible electric cooking device which will remain liquid tight after relatively long periods of use.

Briefly, in the preferred form of the invention, the bottom of an electric cooking vessel is provided with an improved low cost sealed chamber for the necessary parts such as an electric heater and control switch. The sealed chamber is provided by a generally cup-shaped member which is sealed to the bottom of the vessel by a continuous weld. Electric terminals for the device are mounted in the side of the cup-shaped member. These terminals are sealed by compression type glass or ceramic bushings which have proven to be liquid tight long after the rubber sealing gaskets or the like of the prior art have deteriorated, relaxed or otherwise become no longer liquid tight. Additionally, in the preferred form of the invention, the cup-shaped member is surrounded by a spaced annular thermal insulating material member which serves as a support for the vessel, a guard for the terminals and a guide for bringing a socket type plug connector of an electric extension cord into engagement with the terminals.

The features of the invention which are believed to be novel are set forth with particularity in the appended claims. The invention itself, however, both as to its organization and operation, together with further objects and advantages thereof, may best be understood by reference to the following description taken in connection with the accompanying drawings.

In the drawings:

FIG. 1 is a perspective view of a coffee percolator using the invention;

FIG. 2 is an enlarged sectional view taken along the section line 2—2 of FIG. 1;

FIG. 3 is an enlarged broken away bottom view of the device;

FIG. 4 is an enlarged sectional view taken along the section line 4—4 of FIG. 3;

FIG. 5 is an enlarged sectional view taken along the section line 5—5 of FIG. 3;

FIG. 6 is an enlarged sectional view taken along the section line 6—6 of FIG. 5;

FIG. 7 is a diagrammatic illustration of the electric circuit utilized in the coffee percolator; and FIG. 8 is an enlarged sectional view taken along the section line 8—8 of FIG. 3.

Referring first to FIGS. 1 to 3, the coffee percolator comprises a vessel 1 having side walls 2, a bottom 3, a pouring spout 4, a closure cap 5 and a handle 6. The central portion 7 of the bottom 3 is depressed to define a percolator pump well or chamber 8. A precolator pump disc member 9 attached to a hollow stem 10 has an annular gasket secured to its underside. The member 9 is seated in the well 8. Connected to the upper portion of stem 10 is a coffee grain containing basket 12 which is closed by a spring biased perforated cover 13. A not shown one way check valve is formed in the member 9. This not shown one way check valve opens to admit liquid into the chamber 8 and is automatically closed when the pressure therein increases to force the liquid in chamber 8 up through the stem 10 into the coffee grain basket 12 through the perforated cover 13. These aspects of the device, namely the construction and operation of the percolator pump and its attached covered coffee grain basket, are more particularly described in copeding Jepson and Wickenberg patent application, Serial No. 117,078 for Cooking Vessel, filed June 14, 1961.

The liquid in the pump chamber 8 is heated by a main electrical heater 14 which is secured to the underside of the depressed central portion 7. The form of heater 14 is well known in the art and comprises an outer metallic sheath 15, a central heater wire 16 and thermally conductive electric insulation 17 between the elements 15 and 16. The heater 14 is in good thermal conductive relationship with the portion 7 by connection of heater 14 to portion 7 by a high temperature braze or the like.

Also disposed along the underside of the vessel bottom 3 is an auxiliary or keep-warm heater 18. The heater 18 may comprise a heater wire 19, see FIG. 7, disposed within a thermally conductive woven and flexible electrical insulating material sheath 20, see FIG. 3. The two heaters 14 and 18 are controlled by an electric switch indicated generally by reference numeral 21, and the heaters are energized by bringing a socket type electric connector plug 22, see FIG. 1, into engagement with a pair of electrical terminals 23, see FIG. 3.

The electrical circuit for the device is diagrammatically illustrated in FIG. 7. The heaters 14 and 18 are connected in electrical series relationship with each other, and the switch 21 is in electrical shunt or parallel relationship with respect to the keep-warm heater 18. During starting up operation the switch 21 is closed. This means that the keep-warm heater, which is a high resistance heater, is effectively off or removed from the circuit. The main heater 14 provides the heat for operating the percolator pump to brew the coffee. After the coffee brewing is completed, the switch 21, which is thermally responsive in a manner to be more particularly described hereinafter, opens to, in effect, turn the keep-warm heater 18 on and the main heater 14 off. The main heater 14 is a low resistance heater which draws high current. However, when the keep-warm heater 18 is connected in series therewith, its high resistance reduces the current passing through the main heater 14 so that in effect it is turned off or develops insufficient heat to operate the percolator pump. However, the heat developed by the heaters 14 and 18 at this stage is sufficient to keep the coffee warm.

Referring now to FIGS. 5 and 6 as well as FIG. 3, the switch 21 will now be described. The switch 21 is supported on the vessel bottom by a heat transfer lug 24 which is welded or brazed to a side wall of the pump well 8. The switch 21 comprises a thermally responsive bimetallic actuator 25 and a pair of resilient spring contact arms 26 and 27 which are supported on the lug 24 by a stud or the like 28. As will be obvious to those skilled in the art, the elements 25–27 are electrically insulated from with respect to each other as by an insulating sleeve 29 and washers 30. The contact arms 26 and 27 have contacts 31 and 32 connected thereto, respectively, and the contacts 31 and 32 are opened and closed with respect to each other by deflection of the bimetallic element 25. The bimetallic element 25 has an insulating button 33 thereon which engages the outer end of spring contact arm 27. Normally, the contacts 31 and 32 are closed. However, at the end of the coffee brewing operation, the bimetallic element 25 is sufficiently heated to cause it to deflect downwardly to move the switch arm 27 away from the switch arm 26 thereby removing contact 32 away from contact 31 to open the switch. The bimetallic element 25 is thermally responsive to the temperature of the contents of the coffee vessel inasmuch as it is in thermally conductive relationship with the heat transfer lug 24 which is in intimate thermal relationship with the bottom of the vessel.

The main heater 14 is in the form of a loop with its central portion being re-entrantly curved. This geometry provides a high rate of heat transfer to the percolator pump. The keep-warm heater 18 is supported along the bottom of the vessel just outward of the percolator pump well 7. The keep-warm heater 18 may have its central portion supported by a strap or the like 34 connected to the bottom of the vessel. The heaters 14 and 18 are sufficiently closely positioned to the bimetallic element 25 to emanate enough heat to this element to keep it in deflected switch open position after the coffee brewing operation, and the two heaters together provide enough heat to make up for any heat which is lost by the brewed coffee to the ambient.

The bottom 3 of the vessel 1 has a peripherally extending downwardly turned flange 35. The flange 35 is positioned within the side walls 2 and connected thereto in liquid tight fashion by means such as soft solder 36. If the vessel 1 is to be fully immersible in a cleaning liquid, it is clear that means must be provided for sealing the electrical parts such as the heaters and the switch from the cleaning liquid. In the preferred form of the invention, these parts are sealed by a generally cup-shaped metallic member 37 which is positioned against the bottom 3 to seal just the bottom which is the only part of the vessel which must necessarily be sealed to make the device fully immersible for cleaning purposes. The cup-shaped member is provided with two flanges 38 and 39, the flange 38 extending outwardly and the flange 39 extending downwardly. The flange 38 butts up against the bottom 3 outward of the pump well 8, and the flange 39 is seated within the flange 35. These two parts, namely the cup-shaped member 37 and the vessel bottom 3, are sealed with respect to each other by forming a continuous weld between their respective flanges 39 and 35. This manner of providing a sealed liquid tight chamber for the necessary electrical parts such as the electric heaters and switch is very low cost and expeditious from a manufacturing point of view. The complications of prior art soldering or brazing operations are overcome, and essentially the invention merely requires positioning of the cup-shaped member 37 against the bottom 3 of the vessel and a suitable welding jig to provide a continuous weld therebetween. It will be appreciated that with the invention it is possible to first assemble all the parts such as the heaters and switch on the bottom 3 and then seal it closed with cup member 37, and thereafter the sealed chamber defined by parts 3 and 37 is connected to the vessel 1.

In order to keep the cost of the device low and the manufacturing operation simple, a minimum of complications are required. For example, the coffee percolator preferably is not adjustable by the user. Selectability of the coffee blend by the user would require having a movable adjustable member extending through the cup-shaped member 37 to the switch 21 for purposes of adjusting the trip point of the same. In the preferred form of invention, a factory adjustment is provided to brew coffee of average strength and then the cup-shaped member 37 is finally sealed closed. Referring to FIG. 5, it will be seen that a bracket 41 is supported on the stud 28 and this bracket carries an insulating stud 42 which can be moved towards and away from with respect to the switch 21. The underside of the cup-shaped member 37 is provided with an aperture 43 so that a tool such as a screw driver can be inserted into the sealed chamber to set the switch 21 for brewing coffee of average strength. Thereafter the aperture 43 is sealed closed by a soldered closure member 44.

The only other openings required in the cup-shaped member 37 are those necessitated by the electrical terminal pins 23. However, it will be noted that none of these openings have movable members extending therethrough so that with the invention it is relatively easy to provide effective and long life seals. Referring particularly to FIG. 8, each of the electrical terminal assemblies comprises a central terminal pin 23, a surrounding insulating material ceramic or glass bushing 45 and an outer metallic collar 46. An aperture 47 is formed in the side wall of the cup-shaped member 37. The subassembly comprising the three parts 23, 45, 46 are single lead compression type terminals which are currently available on the commercial market. These three parts have their thermal coefficients of expansion selected so that when they are assembled together and fired, a liquid tight seal is formed between the pin 23 and the bushing 45 and the bushing 45 and the collar 46, and the bushing 45 is in a state of compression between the metallic parts 23 and 46. These assemblies are inserted into the apertures 47 formed in the side wall of cup-shaped member 37, and a solder seal is provided between the collars 46 and the edges of openings 47. Since the terminal pins 23 are rigidly mounted, there is no problem of leakage as in the prior art which may utilize rubber or the like sealing gaskets which do not have a long life and may leak when distorted by unequal forces. Additionally, the strength of the seal is increased in the instant invention inasmuch as the ceramic bushings 45 are in a state of compression. It is well known that ceramic or glass is relatively poor in tensile strength whereas it is relatively good in compressive strength. Therefore, placing the bushings in a state of precompression offsets any weakness they may have from the standpoint of tensile strength.

Additionally, in the preferred form of the invention, a guard is provided for shielding the terminal pins 23 and guiding the socket type connector cord plug 22 into engagement with the pins 23. The combination shield and guard comprises an annular thermal insulating member 48 which is positioned against the bottom of the vessel in spaced relationship with respect to the cup-shaped member 37. The member 48 is retained on vessel 1 by a pair of springs 49 suitably connected to opposite sides of the cup-shaped member 37 and engageable with a pair of recessed lugs 50 formed on the inside of the annular member 48, see FIGS. 3 and 4. That is to say, the member 48 can be snapped into position and it can also be relatively easily removed by overcoming the spring tension of members 49.

The annular member 48 is also a support collar for the vessel 1. Member 48 is open at its bottom and extends slightly below the underside of cup-shaped member 37 to support the coffee percolator on a surface such as a table top. The lower end of member 48 can be provided with a plurality of spaced supporting feet 51 which can be integrallly formed with member 48. On the side of member 48 contiguous to the terminal pins 23 is formed an opening 52. This opening 52 provides access to the terminal pins 23. The terminal pins 23 do not extend radially beyond the side of member 48 so that member 48 serves as a guard for the terminal pins 23. Also the opening 42 is provided with a suitable configuration to serve as a guide for the connector cord plug 22 so as to properly align its not shown socket type contacts with the terminal pins 23.

In manufacturing the coffee percolator, the invention makes it possible to preassemble the electrical components in the chamber defined by parts 3 and 37 and then seal these two parts with respect to each other to, in essence, form a self contained sealed electrical heater and control unit. For example, the electrical components such as the heaters and switch can be first connected to the part 3 and the terminal assemblies to the part 37. Then parts 3 and 37 are sealed closed by a continuous weld along flanges 35 and 39. Thereafter, the sealed heater and switch unit can be connected to the vessel by soft solder 36.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. An immersible electric cooking device comprising a vessel open at its bottom, a sealed electric heater and control switch unit, said unit comprising a pair of members which are spaced with respect to each other and sealed closed to define a sealed chamber therebetween, an electric heater and control switch in said chamber, sealed terminal means extending through said sealed chamber, and said sealed chamber positioned within said open vessel bottom and sealed closed with respect thereto, said device comprising an electric coffee percolator, said pair of members being vertically superposed, the upper member having a coffee percolator pump well integrally formed therein, the lower member being cup-shaped, said sealed terminal means comprising a pair of electrical terminal assemblies for said heater and switch, each terminal assembly comprising an aperture formed in the side of said cup-shaped member, a metallic collar positioned in said aperture, said aperture and collar being sealed with respect to each other by a metallic seal, a metallic terminal pin extending axially through said collar in spaced relationship thereto, and said pin and collar being sealed with respect to each other by a glass bushing interposed therebetween, said bushing being in a state of compression and being bonded to said pin and collar by firing the three parts together.

2. In an immersible electric cooking device as in claim 1, wherein an annular heat insulating material support member is connected to said bottom for supporting said vessel on a support surface with the underside of said cup-shaped member being exposed and spaced above said support surface, said heat insulating annular member being disposed about said cup-shaped member in spaced relationship, an aperture being formed in the side of said heat insulating annular member in alignment with said pair of terminal assemblies for engaging an electrical plug with the terminal pins thereof, said terminal pins extending radially outward up to said last-mentioned aperture, and the edges of said last-mentioned aperture providing guide means for alignment of an electrical plug with said pins.

References Cited by the Examiner

UNITED STATES PATENTS

| | | | |
|---|---|---|---|
| 1,174,032 | 2/1916 | Hadaway | 219—436 |
| 2,503,429 | 4/1950 | Ziegler | 174—152 |
| 2,610,284 | 9/1952 | Kalisch | 219—441 |
| 2,798,143 | 7/1957 | O'Brien | 219—441 |
| 2,857,502 | 10/1958 | Schwaneke et al. | 219—441 |
| 2,915,614 | 12/1959 | Loomis | 219—441 |
| 2,924,698 | 2/1960 | Jepson | 219—441 |
| 3,022,411 | 2/1962 | Soper et al. | 219—441 |
| 3,098,918 | 7/1963 | Koci et al. | 219—442 |
| 3,135,189 | 6/1964 | Jepson et al. | 219—441 X |

ANTHONY BARTIS, *Primary Examiner.*

RICHARD M. WOOD, *Examiner.*